Patented Nov. 17, 1942

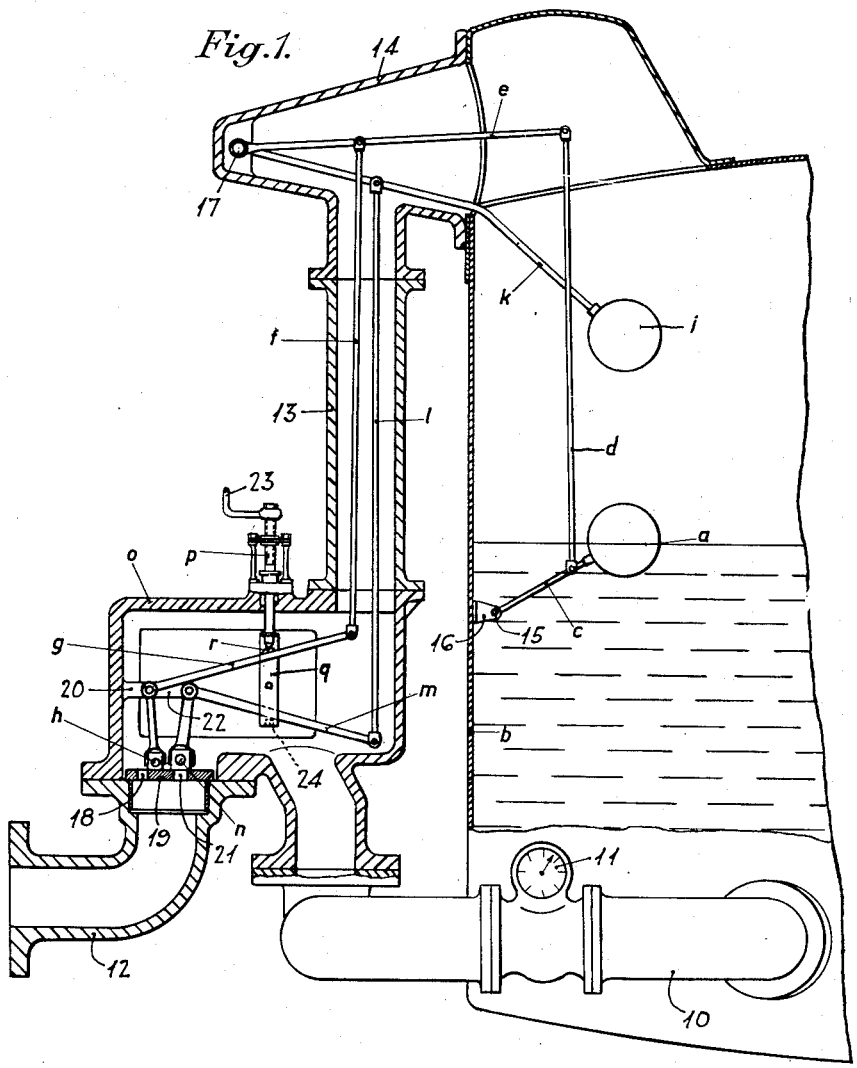

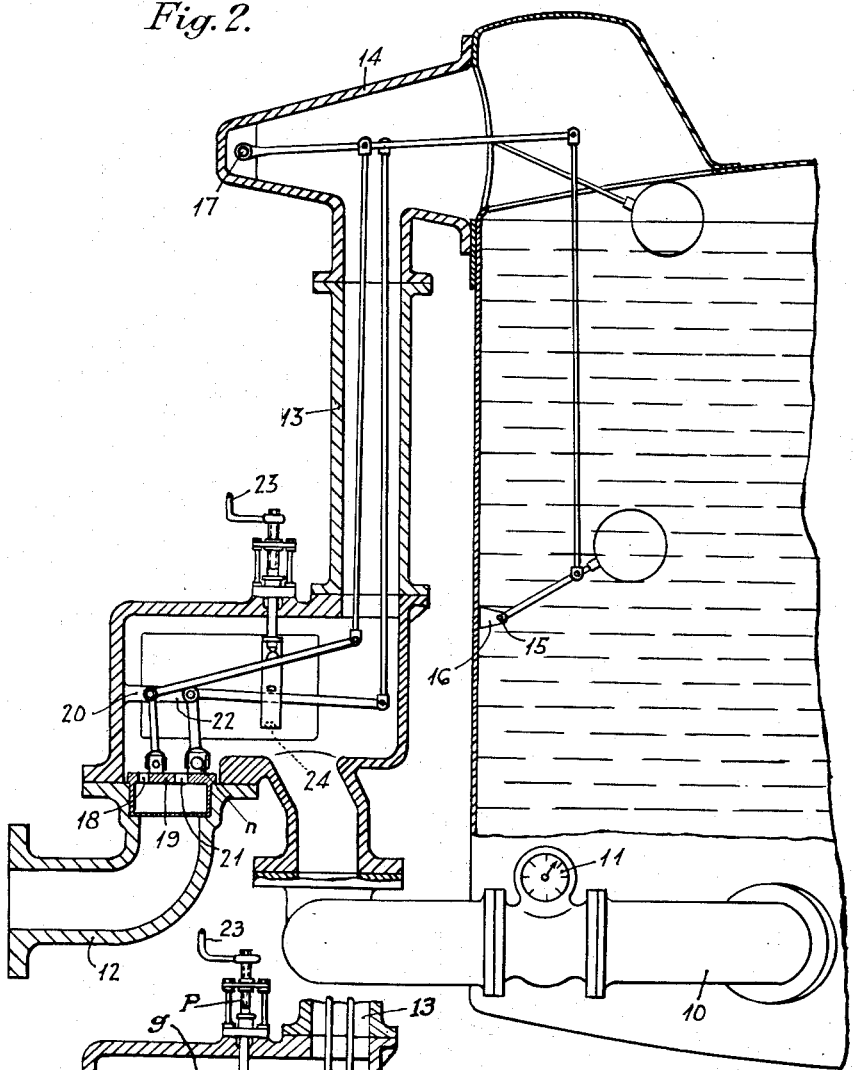
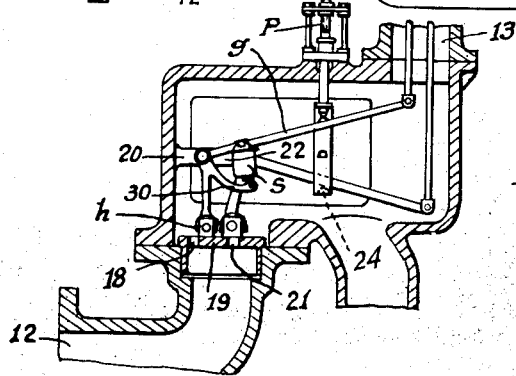

2,301,972

UNITED STATES PATENT OFFICE 2,301,972

FLOW REGULATOR FOR PETROLEUM SEPARATORS

Hans Richter, Bremen, Germany; vested in the Alien Property Custodian

Application April 17, 1940, Serial No. 330,055
In Germany July 15, 1939

2 Claims. (Cl. 137—68)

This invention relates to a return flow regulator for petroleum separators.

The co-pending German patent application, Serial No. G.100,012 VI/5a filed May 6, 1939, in the name of Gustav F. Gerdts, describes a flow regulator for petroleum separators wherein two valves are opened one after the other by a single float depending upon the level of the liquid, a valve of comparatively small diameter being opened when the level is low, while a valve of larger diameter is opened when the liquid reaches a comparatively high level.

The float is so constructed that the smaller valve remains completely open during a comparatively great extent of movement of the float and, consequently, during many different positions of the liquid level, thereby assuring a uniform outflow of the liquid, while the function of the larger valve is to prevent excessively large amounts of petroleum from flowing out too slowly, thereby avoiding the danger that petroleum will penetrate into the gas conduits.

An object of the present invention is to improve a construction of this type by eliminating heavy movable elements which were necessary in the original construction and which required an excessively large valve casing, by using a separate float and its leverage system as a bearing down element while the level of the liquid is below the float.

Another object is the provision of a flow regulator which is easily accessible to a workman for operating and cleaning purposes, said regulator being so constructed that a single threaded spindle can be used for raising and opening both valves and also for limiting the movement of the smaller valve.

Other objects of the present invention will become apparent in the course of the following specification.

The objects of the present invention may be realized through the provision of an outflow regulator comprising two separate floats, one of these floats being situated close to the lowermost admissible level of the liquid while the other float is situated close to the highest admissible liquid level.

The two floats are connected by separate leverage systems with two valves, the lower float being connected with the smaller valve, while the upper float is connected with the larger valve. The device is so constructed that as long as the level of the liquid within the separator does not rise beyond a certain height, only the smaller valve remains open; the smaller valve stays completely open and provides for a uniform outflow of petroleum until the level of petroleum in the separator has risen so high that the second float is also actuated to open in addition the second larger valve.

This invention will appear more clearly from the following detailed description when taken in connection with the accompanying drawings showing by way of example preferred embodiments of the inventive idea.

In the drawings:

Figure 1 shows partly in vertical section and partly in side elevation a flow regulator constructed in accordance with the principles of the present invention.

Figure 2 is similar to Figure 1 and shows the regulator in a different position; and Figure 3 shows in section a portion of a somewhat differently constructed flow regulator.

The flow regulator shown in Figures 1 and 2 of the drawings comprises a separator $b$ having an outflow pipe 10 which carries a measuring instrument 11 and which is connected with a casing $o$. Petroleum or other liquid flowing into the casing $o$ is removed therefrom through the pipe 12.

The upper end of the casing $o$ is in communication with a vertical pipe 13 which is connected to a cover 14 attached to the upper part of the separator $b$.

Two floats $a$ and $i$ are situated within the separator $b$. The float $a$ is provided close to the lowermost permissible level of the liquid within the separator $b$. One end of a lever $c$ is pivoted at 15 to a support 16 mounted upon an inner wall of the separator $b$.

The lever $c$ is pivotally connected intermediate its ends to one end of a rod $d$. The rod $d$ extends substantially vertically and its upper end is connected to one end of a lever $e$. The opposite end at the lever $e$ is pivoted at 17 to the cover 14.

The lever $e$ is pivotally connected intermediate its ends to the upper end of a vertical rod $f$ which extends through the pipe 13. The lower end of the rod $f$ is connected with one end of an angular double armed lever $g$. The lower end of the lever $g$ carries a valve body or slide $h$ which is adapted to close a comparatively small opening 18 provided in a plate 19 which is situated between the casing $o$ and the pipe 12. The double armed lever $g$ is supported at 20.

The upper float $i$ is situated close to the uppermost admissible level of the liquid within the separator $b$. The float $i$ is carried by one end of a lever $k$ which is pivoted at 17 and is connected intermediate its ends to a rod $l$. The rod $l$ is pivotally connected with one end of an angular double armed lever $m$, the opposite end of which carries a valve body or slide $n$. The slide $n$ is adapted to close a comparatively large opening 21 provided in the plate 19. The lever $m$ is supported at 22.

The casing $o$ carries a spindle $p$ provided with screw threads and carrying a handle 23. The lower end of the spindle $p$ projects into the casing $o$ and carries a yoke $q$ which is rotatably suspended therefrom and encloses the two double armed levers $g$ and $m$. The yoke $q$ carries abutments $r$ and 24 for the levers $g$ and $m$, respectively.

The operation of the device is as follows:

The opening 18 is closed normally when there is no liquid within the separator $b$ or when the level of the liquid is quite low.

When the level of the liquid reaches a predetermined position the liquid will raise the float $a$ and the rod $d$ connected therewith by the lever $c$. The lever $e$ will swing upwardly along with the rod $f$ and will turn the double armed lever $g$ which will move the slide $h$ to the position shown in Figure 1. In this position, the passage 18 is open so that the liquid can flow from the container $b$ and through the pipe 10, the casing $o$ and the passage 18 to the pipe 12.

The opening 18 remains open throughout any further rise of the level. The liquid flows out uniformly until the float $i$ is actuated and the amount of the flow can be easily measured by the instrument 11.

If level of the liquid continues to rise, it will finally raise the second float $i$ and then the lever $k$, the rod $l$ and the double armed lever $m$ will be actuated. The lever $m$ will move the slide or valve body $n$ to the position shown in Figure 2, thereby freeing the second larger opening or passage 21.

The liquid can now flow rapidly from the container $o$ through the two passages 18 and 21 to the pipe 12. Since the outflow takes place very quickly, a further rise of the liquid level and a penetration of the liquid into the pipe 13 are effectively avoided.

When the level of the liquid sinks again, the upper float $i$ will be the first one to return to its inoperative position shown in Figure 1 and the opening 21 will be closed by the slide $n$. The opening 18 remains completely open until the level of the liquid sinks below the float $a$.

The upper movement of the float $a$, the rod $d$, the lever $e$ and the rod $f$ is limited by the abutment $r$ carried by the yoke $q$ and engaged by the lever $g$ in the course of the upward movement of the float $a$, as shown in Figure 1. Thus, the abutment $r$ limits the extent of movement of the slide $h$. The abutment $r$ does not come in contact, however, with the double armed lever $m$. The lowermost inoperative position of the lever $m$ and of the elements connected therewith is limited by the abutment 24.

The yoke $q$ carrying the abutments $r$ and 24 can be conveniently used for another purpose, namely, for opening the passages 18 and 21 irrespective of the position of the liquid within the container $b$. This is accomplished by the operator merely by turning the handle 23.

Since the abutment $r$ is engaged only by the lever $g$ and not by the lever $m$, the latter will be actuated to open the passage 21 when the level of the liquid within the separator $b$ is excessively high, irrespective of any manual adjustment of the lever $g$ and of the slide $h$ which is connected therewith.

Figure 3 relates to a somewhat different construction, the same parts having been indicated by the same letters and numerals. In accordance with this construction, a pressure compensating device $s$ is included between the lever $g$ and the slide $h$ which is actuated by the lever $g$.

The pressure compensating device $s$ is of the usual type well-known in the art which becomes elongated upon an increase of pressure. Such a device, for instance, may consist of a pressure responsive diaphragm and a spring situated within this diaphragm.

Pressure prevailing in the separator $b$ is transmitted through the pipe 10 to the instrument $s$ and actuates this instrument which in its turn will automatically shift the position of the lever $g$, irrespective of any manual adjustment which can be carried out by means of the spindle $p$ and the yoke $q$. If pressure is increased, the device $s$ will move the lever extension 30 away from the lever $g$ to cause a partial closing of the passage 18 by the slide $h$. When pressure is decreased, the slide 18 is moved by the device $s$ in the opposite direction.

It is apparent that the illustrations shown above have been given by way of illustration and not by way of limitation and that the structures above described are subject to wide variation and modification without departing from the scope or intent of the invention, all of such variations and modifications are to be included within the scope of the present invention.

What is claimed is:

1. An outflow regulator for petroleum separators, said regulator comprising means restricting the flow of a liquid and having a smaller passage and a larger passage formed therein, a separate valve for closing and opening each passage, a separate lever connected with each valve, two separate floats situated at different levels, means connecting the float situated at the higher level with the lever which is connected with that valve which open and close the larger passage, means connecting the float situated at the lower level with the lever which is connected with that valve which open and close the smaller passage, a yoke extending over the levers and having an abutment engaged by the lever which is connected with the valve closing and opening the smaller passage, said abutment being devoid of engagement with the other lever, a threaded spindle carrying said yoke, and a casing carrying said spindle, said casing being connected with the flow restricting means and enclosing said levers.

2. An outflow regulator for petroleum separators, said regulator comprising means restricting the flow of a liquid and having two passages formed therein, a separate valve for closing and opening each passage, separate leverage systems connected with the valves, one of the leverage systems including a pressure compensating device, and means connected with said leverage systems and actuated by at least two different liquid levels for operating said leverage systems to cause each valve to close and open its passage independently of the other valve.

HANS RICHTER.